United States Patent
Zhang et al.

(10) Patent No.: US 12,313,920 B2
(45) Date of Patent: May 27, 2025

(54) OPTICAL DEVICE CONFIGURED FOR STRESS MITIGATION

(71) Applicant: HyperLight Corporation, Cambridge, MA (US)

(72) Inventors: Mian Zhang, Cambridge, MA (US); Kevin Luke, Cambridge, MA (US); Roy Meade, Bastrop, TX (US); Prashanta Kharel, Cambridge, MA (US); Christian Reimer, Wellesley, MA (US); Fan Ye, Lincoln, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 18/209,415

(22) Filed: Jun. 13, 2023

(65) Prior Publication Data

US 2023/0400717 A1 Dec. 14, 2023

Related U.S. Application Data

(60) Provisional application No. 63/352,135, filed on Jun. 14, 2022.

(51) Int. Cl.
*G02F 1/035* (2006.01)

(52) U.S. Cl.
CPC ........ *G02F 1/035* (2013.01); *G02F 2201/063* (2013.01); *G02F 2202/20* (2013.01)

(58) Field of Classification Search
CPC . G02F 1/035; G02F 2201/063; G02F 2202/20
USPC ....................................................... 385/1–3
See application file for complete search history.

(56) References Cited

U.S. PATENT DOCUMENTS

| 4,781,424 A | 11/1988 | Kawachi | |
|---|---|---|---|
| 6,674,565 B2* | 1/2004 | Kondo | G02F 1/2255 385/39 |
| 9,746,743 B1* | 8/2017 | Rabiei | G02B 6/12009 |
| 10,295,849 B2* | 5/2019 | Kissa | G02F 1/0356 |
| 10,754,221 B2* | 8/2020 | Yamada | G02B 6/29353 |
| 2006/0115196 A1* | 6/2006 | Feke | G02F 1/035 385/39 |

(Continued)

FOREIGN PATENT DOCUMENTS

| JP | 2009-134279 A | † | 6/2009 |
| JP | 2013-174838 A | † | 9/2013 |

(Continued)

OTHER PUBLICATIONS

"Optical and electro-optical properties of submicrometer lithium niobate slab waveguides prepared by crystal ion slicing and wafer bonding" by Rabiei et al, Applied Physics Letters, vol. 85, No. 20, pp. 4603-4605 (Year: 2004).*

*Primary Examiner* — Robert Tavlykaev
(74) *Attorney, Agent, or Firm* — Van Pelt, Yi & James LLP

(57) ABSTRACT

An electro-optic device is described. The electro-optic device includes at least one optical material having an electro-optic effect. Further, the optical material(s) include lithium. The optical material(s) have a slab and a ridge waveguide. The slab has a top surface. The slab includes free surfaces. Each of the free surfaces is at a nonzero angle from the top surface of the slab and mitigates stress in the slab.

19 Claims, 8 Drawing Sheets

(56) References Cited

U.S. PATENT DOCUMENTS

| | | | |
|---|---|---|---|
| 2010/0080507 A1* | 4/2010 | Shiraishi | B29D 11/00663 |
| | | | 264/1.24 |
| 2016/0062155 A1 | 3/2016 | Ichikawa | |
| 2017/0307824 A1† | 10/2017 | Usami | |
| 2019/0227350 A1* | 7/2019 | Puckett | H04B 10/505 |
| 2020/0310170 A1* | 10/2020 | Iwatsuka | G02F 1/011 |
| 2021/0157177 A1 | 5/2021 | Kharel | |

FOREIGN PATENT DOCUMENTS

| | | | | |
|---|---|---|---|---|
| WO | WO 98/55889 | * | 12/1998 | G02B 6/12 |
| WO | 2018031916 | | 2/2018 | |

\* cited by examiner
† cited by third party

OPTICAL DEVICE CONFIGURED FOR STRESS MITIGATION

CROSS REFERENCE TO OTHER APPLICATIONS

This application claims priority to U.S. Provisional Patent Application No. 63/352,135 entitled OPTICAL DEVICE CONFIGURED FOR STRESS MITIGATION filed Jun. 14, 2022 which is incorporated herein by reference for all purposes.

BACKGROUND OF THE INVENTION

Electro-optic devices (also termed optical devices herein) frequently include waveguides and electrodes in proximity to portions of the waveguides. The waveguide carries an optical signal and includes an electro-optic material. An electro-optic material exhibits the electro-optic effect and has its index of refraction modulated by an electric field. The electrodes are used to generate an electric field at or near the waveguide. This electric field causes a change in the index of refraction of the waveguide, which results in the optical signal being modulated. The desired modulation of the optical signal may be achieved by driving the appropriate electrode signal through electrodes.

Although electro-optic devices function, their performance may be limited by various factors. Bulk lithium niobate (LN), for example, may be desired to be used in electro-optic devices because of its large variation in refractive index for a given applied external electric field. However, bulk LN, as well as other technologies, suffer from significant drawbacks. Fabrication of LN optical devices having desired performance characteristics is challenging. For example, LN waveguides may have higher optical losses than desired. In some cases, scattering losses (e.g. from sidewalls) and absorption losses (e.g. from characteristics of the material itself) may be larger than desired. Consequently, techniques for improving the performance of electro-optic devices are desired.

BRIEF DESCRIPTION OF THE DRAWINGS

Various embodiments of the invention are disclosed in the following detailed description and the accompanying drawings.

DETAILED DESCRIPTION

Figure 1A:
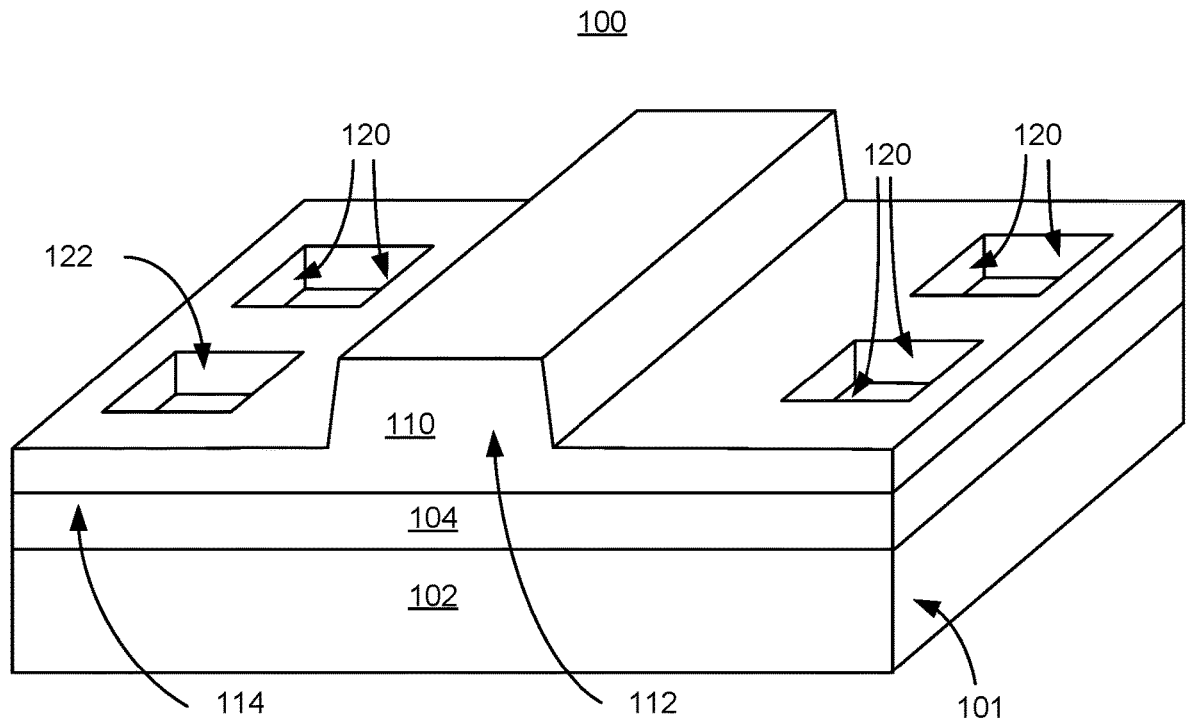
FIGS. 1A-1D depict embodiments of electro-optic devices utilizing thin film electro-optic materials including lithium.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The basic elements of electro-optic devices (also termed optical devices), such as electro-optic modulators, include waveguides and electrodes around the waveguides. The waveguide carries an optical signal and includes an electro-optic material. An electro-optic material exhibits the electro-optic effect and has its index of refraction modulated by an electric field. The electrodes are used to generate an electric field, or voltage difference, at or near the waveguide. This electric field causes a change in the index of refraction of the waveguide, which results in the optical signal being modulated. For example, an electrode signal (e.g. a microwave signal) may be applied to the electrodes. Thus, the electrodes act as transmission lines. The electrode signal travels in the same direction as the optical signal propagating through the waveguide. The electrode signal generates a corresponding electric field at the waveguide, modulating the index of refraction of the waveguide. Therefore, the optical signal is modulated as the optical signal travels through the waveguide. Thus, the desired modulation of the optical signal may be achieved by driving the appropriate electrode signal through electrodes.

Although electro-optic devices function, their performance may be limited by a number of factors. Many technologies have been proposed to improve the optical devices. These technologies include waveguides utilizing semiconductors (e.g. silicon and/or indium phosphide), bulk lithium niobate (LN), barium titanate (BTO), and/or plasmonics. However, these and other technologies suffer significant drawbacks in one or more of the characteristics mentioned above. For example, LN is desired to be used in electro-optical devices. The desirability of LN is due at least in part to variation in the refractive index of LN with an applied external electric field. However, fabrication of LN optical devices having desired performance characteristics is challenging. For example, LN waveguides may have higher optical losses than desired. In some cases, scattering losses (e.g. from sidewalls) and absorption losses (e.g. from characteristics of the material itself) may be larger than desired.

An electro-optic device is described. The electro-optic device includes at least one optical material having an electro-optic effect. Further, the optical material(s) include lithium. The optical material(s) have a slab and a ridge waveguide. The slab has a top surface. The slab includes free surfaces. Each of the free surfaces is at a nonzero angle from the top surface of the slab and mitigates stress in the slab. The optical material(s) may include or consist of lithium niobate and/or lithium tantalate. Further, the optical material(s) may be thin films. Thus, the optical material(s) may have a thickness of not more than ten micrometers, not more than five micrometers, not more than three micrometers, not more than one micrometer, not more than seven hundred nanometers, not more than four hundred nanometers, and/or at least one hundred nanometers.

In some embodiments, the electro-optic device also includes an electrode. A portion of the slab is between the ridge waveguide and the electrode. In such embodiments, at least one of the free surfaces is further from the ridge waveguide than the electrode is. Thus, the electrode is on (e.g. directly on or above) the top surface of the slab. In some other embodiments, the electro-optic device also includes an electrode. At least a portion of the slab is between the ridge waveguide and the electrode. In such embodiments, at least one of the free surfaces is closer to the ridge waveguide than the electrode is. In some such embodiments, the electro-optic device also includes a cladding layer. At least a portion of the electrode is on the cladding layer. In some embodiments, the first edge and the second edge are substantially parallel to at least a portion of the ridge waveguide.

The slab may have an edge. At least one of the free surfaces is between the edge of the slab and the ridge waveguide. In some embodiments, the slab resides on a substrate. At least one of the free surfaces extends from the top surface of the slab to the substrate. The slab may reside on a substrate. The slab has a thickness. At least one of the free surfaces extends through the slab a distance less than the thickness. In some embodiments, the free surfaces define at least one aperture in the slab. The optical material(s) may include an additional ridge waveguide. Thus, multiple waveguides may be formed on or in by portions of the optical material. The slab may include a trench therein. The trench has a sidewall and is parallel to at least a portion of the ridge waveguide. A free surface of the plurality of free surfaces being the sidewall.

An electro-optic device including optical material(s0, electrodes and a substrate is described. The optical material(s) exhibit an electro-optic effect and include lithium, The optical material(s) having a slab and a ridge waveguide. The slab has a top surface, a first edge, and a second edge. The first edge and the second edge are substantially parallel to a portion of the ridge waveguide. The ridge waveguide is between a first electrode and a second electrode of the plurality of electrodes. The substrate has substrate edges. The first edge of the slab is between the ridge waveguide and a first substrate edge. The second edge of the slab is between the ridge waveguide and a second substrate edge. The first edge and the second edge form free surfaces at a nonzero angle from the top surface of the slab.

In some embodiments, the first edge of the slab is between the first electrode and the ridge waveguide/The second edge of the slab is between the second electrode and the ridge waveguide.

A method provides an electro-optic device. The method includes providing a ridge waveguide from optical material(s) having an electro-optic effect and including lithium. The optical material(s) have a slab and the ridge waveguide. The slab has a top surface. The method also includes providing, for the slab, a plurality of free surfaces. Each of the free surfaces is at a nonzero angle from the top surface of the slab and mitigating stress in the slab. In some embodiments, the optical material(s) include at least one of lithium niobate or lithium tantalate. In some embodiments, the method further includes annealing at least one anneal temperature greater than 300 degrees Celsius. In some such embodiments, the anneal temperature(s) are greater than one thousand degrees Celsius.

Figure 1B:
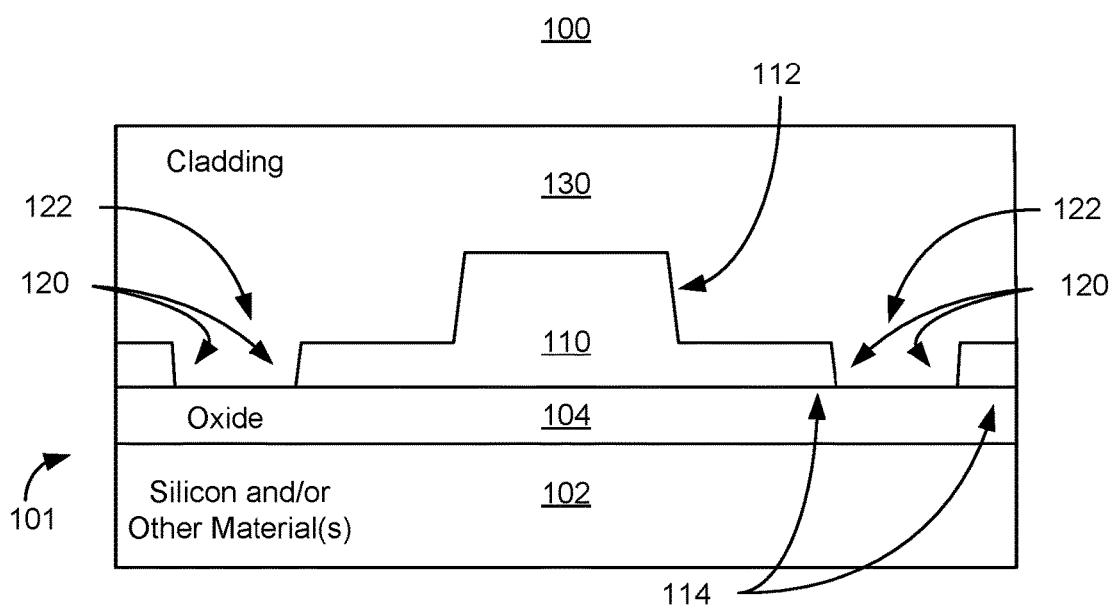

FIGS. 1A-1D depict embodiments of electro-optic devices 100 and 100'. FIGS. 1A and 1B depict perspective and cross-sectional views of an embodiment of electro-optic device 100 utilizing optical material 110 exhibiting the electro-optic effect. The optical material may also include lithium. For example, the optical material 110 may include or consist of one or more of lithium niobate (LN), lithium tantalate (LT), barium titanate (BTO), and/or plasmonics. Thus, although described in singular terms, optical material 110 may include multiple constituents. In some embodiments, the electro-optic effect includes a change in index of refraction in an applied electric field (e.g. due to the Pockels effect). Thus, in some embodiments, optical materials possessing the electro-optic effect in one or more the ranges described herein or consistent with the material(s) described are considered nonlinear optical materials regardless of whether the effect is linearly or nonlinearly dependent on the applied electric field. For example, a nonlinear optical material may exhibit the electro-optic effect of at least (e.g. greater than or equal to) 5 picometer/volt. In some embodiments, the nonlinear optical material has an effect that is at least 10 picometer/volt. In some such embodiments nonlinear optical material has an effect of at least 20 picometer/volt. The nonlinear optical material experiences a change in index of refraction in response to an applied electric field. In some embodiments, the nonlinear optical material is ferroelectric. The nonlinear optical material may be a noncentrosymmetric material. Therefore, the nonlinear optical material may be piezoelectric.

Electro-optic material 110 may also be a thin film. In some embodiments, electro-optic material 110 is not more than ten micrometers in thickness as-deposited. In some embodiments, electro-optic material 110 may be not more than three micrometers thick as-deposited. In some embodiments, electro-optic material 110 may be not more than one micrometer in thickness as-deposited. In some embodiments, the thickness of electro-optic material 110 as-deposited may be not more than seven hundred nanometers. In some such embodiments, this thickness may be not more than four hundred nanometers. In some embodiments, the thickness may be at least one hundred micrometers as-deposited. Other thicknesses are possible.

The optical material 110 is on a substrate 101. In some embodiments, the substrate 101 includes an oxide layer 104 (e.g. $SiO_2$) and an underlying wafer 102 (e.g. silicon). In some embodiments, oxide layer 104 is at least three micrometers thick. In some embodiments, oxide layer 104 is at least five micrometers thick. Other thicknesses are possible. In some embodiments, oxide layer 104 may be omitted. For example, for an underlying sapphire substrate 102, no oxide layer may be present. Also shown is cladding 130, which has an index of refraction that differs from that of ridge waveguide 112. For example, cladding 130 may include or consist of silicon dioxide. For simplicity, cladding 130 is not shown in FIG. 1A.

The optical material 110 has ridge waveguide 112 and slab 114 formed therefrom. In some embodiments, the thickness of ridge waveguide 112 is the thickness of optical material 110 as-deposited. For example, ridge waveguide 112 may have a height (or maximum height if there is a variation in height of ridge waveguide 112) of four hundred nanometers, which may be the as-deposited thickness of optical material 110. In such embodiments, slab 114 may have a height of two hundred nanometers. Ridge waveguide 112 may have a height of less than the thickness of optical material 110 in some embodiments. Slab 114 has a top surface and free surfaces 120. For clarity, only some free surfaces 120 are labeled in FIGS. 1A-1B. In the embodiment shown in FIGS. 1A-1B, free surfaces 120 are formed by apertures 122 in optical material 110. For clarity, not all apertures 122 are labeled. In some embodiments, apertures 122 extend through slab 114. In some embodiments, one or more depressions in slab 114 are used in lieu of some or all of apertures 122. Although indicated as terminating at oxide layer 104, in some embodiments, apertures 122 may extend into or through oxide 104 (e.g. to or into the underlying substrate 102). In some embodiments, apertures 122 may have another configuration. For example, apertures 122 may have other shape(s) (e.g. triangles, circles, hexagons, squares), be separated by other distance(s), and/or be distributed across slab 114 in another manner (e.g. a close-packed distribution and/or a non-rectangular array).

Free surfaces 120 are at a nonzero angle from the top surface of slab 114. In the embodiment shown, free surfaces 120 are substantially perpendicular (e.g. within ten degrees of perpendicular) to the top surface of slab 114 and/or the top surface of substrate 101. In other embodiments, free surfaces 120 may be at another nonzero angle with respect to the top surface of slab 114 and/or substrate 101. For example, free surfaces 120 may be at least fifty degrees and up to ninety degrees from horizontal surfaces (e.g. the top surface of substrate 101). Free surfaces 120 may mitigate stress (e.g. in-plane stress) in slab 114. For example, stress due to annealing and/or other processing may be reduced by free surfaces 120.

Optical structures, such as ridge waveguide 112, formed from optical material 110 may have improved performance. Such optical structures may be formed using UV and/or DUV lithography and other processing that allows for improved surface roughness. In some embodiments, the short-range root mean square (RMS) surface roughness is the RMS surface roughness for lengths (e.g. along direction the axis of ridge waveguide 112) of not more than two hundred nanometers. The short-range RMS surface roughness of sidewalls of waveguide 112 in optical device 100 is less than ten nanometers. In some embodiments, the short-range RMS surface roughness is not more than five nanometers. The short-range RMS surface roughness of the sidewalls of ridge waveguide 112 do not exceed two nanometers in some embodiments. Further, the short-range RMS roughness of the top surfaces of ridge waveguide 112 is not more than one nanometer in some embodiments. In some embodiments, the long range (lengths greater than two hundred nanometers through two hundred micrometers) RMS surface roughness of the sidewalls of ridge waveguide 112 may differ from the short-range RMS surface roughness.

Further, optical material 110 may undergo higher temperature annealing. In some embodiments, optical material 110 is annealed at anneal temperatures greater than 300 degrees Celsius. Optical material 110 may be annealed at anneal temperatures greater than 400 degrees Celsius. In some embodiments, optical material 110 is annealed at anneal temperatures greater than 500 degrees Celsius. Optical material 110 may be annealed at anneal temperatures greater than 600 degrees Celsius. In some embodiments, optical material 110 is annealed at anneal temperatures greater than 700 degrees Celsius. Optical material 110 may be annealed at anneal temperatures greater than 800 degrees Celsius. In some embodiments, optical material 110 is annealed at anneal temperatures greater than 900 degrees Celsius. In some embodiments, optical material 110 is annealed at anneal temperatures greater than 1000 degrees Celsius. High temperature annealing may improve the crystal structure of the optical material (e.g. the structure of LN and/or LT). For example, losses due to absorption in optical material 110 may be reduced.

Figure 1C:
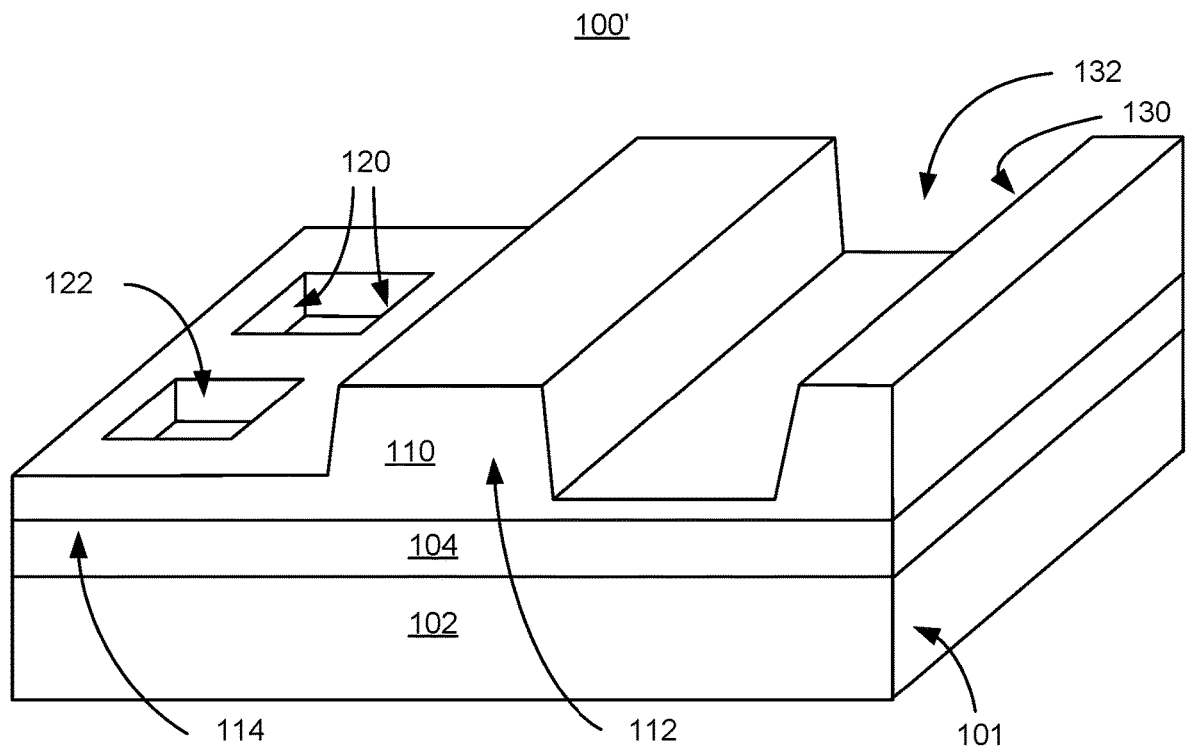
Figure 1D:
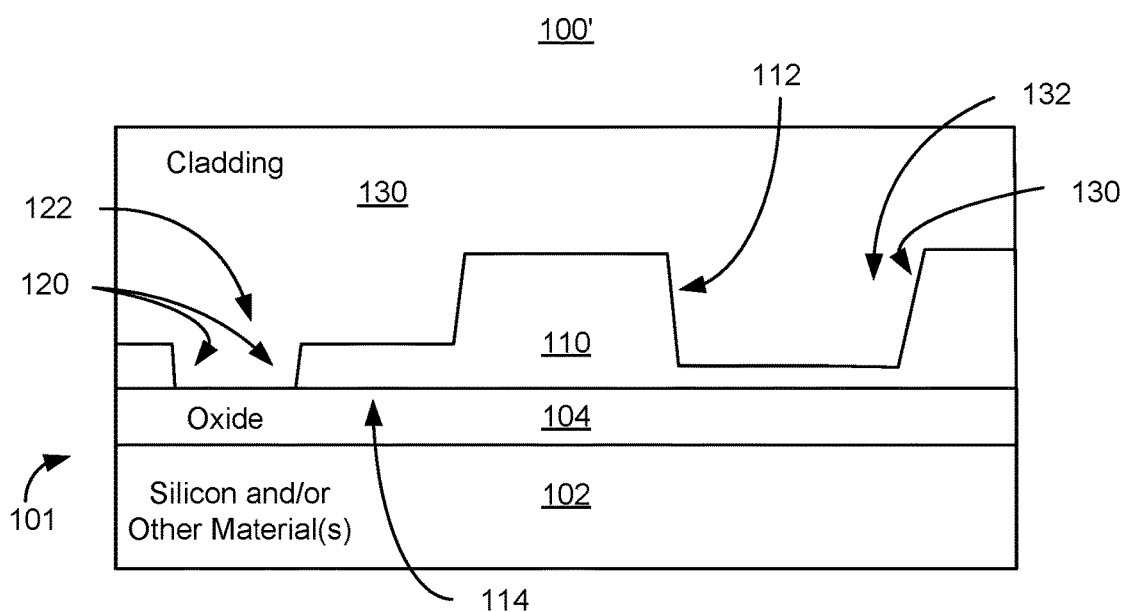

FIGS. 1C and 1D depict perspective and cross-sectional views of an embodiment of electro-optic device 100' that is analogous to electro-optic device 100. For example, the optical material 110 may include or consist of one or more of LN, LT, BTO, and/or plasmonics. Further, optical material 110 includes ridge waveguide 112 and slab 114 that are analogous to corresponding structures shown in FIGS. 1A-1B. The optical material 110 is on substrate 101 including oxide layer 104, and underlying wafer 102 that are analogous to that are analogous to corresponding structures shown in FIGS. 1A-1B. In some embodiments, oxide layer 104 may be omitted. Also shown is cladding 130, which is analogous to cladding 130 shown in FIG. 1B. For clarity, cladding 130 is not shown in FIG. 1C. Also depicted are apertures 122 and free surfaces 120 in slab 114. In some embodiments, some or all of apertures 122 and free surfaces 120 may be omitted. Thus, slab 114 may not include free surfaces 120 in some embodiments.

Also shown in FIGS. 1C and 1D is depression 132 having free surface 130. In contrast to apertures 122, depression 132 does not extend through slab 114. Free surface 130 may have a similar function as free surfaces 120. In some embodiments, the ridge on which free surface 130 is present has a different height than ridge waveguide 112. In other embodiments, the ridge on which free surface 130 is present has the same height as ridge waveguide 112. In some embodiments, the portion of optical materials 110 below depression 132 has the same height as the remainder of slab 114. In some embodiments, shown in FIGS. 1C-1D, the portion of optical materials 110 under depression 132 has a different height than the remainder of slab 114. In the embodiment shown, free surface 132 is on one side of ridge waveguide 112. In other embodiments, depressions 132 and free surfaces 130 may be on both sides of ridge waveguide 112.

Thus, electro-optic device(s) 100 and/or 100' may have improved performance. Because optical material includes materials such as LN and/or LT, the modulation of the index of refraction of waveguide 112 and slab 114 by a given applied electric field may be increased. Because of the fabrication using UV or DUV lithography resulting in reduced surface roughness, optical losses (e.g. due to scattering) may be reduced. Further, annealing at optical material 110 at higher temperatures may further reduce optical losses. For example, optical losses due to absorption may be reduced. The presence of free surfaces 120 and/or 130 can mitigate stress in optical material 110 (e.g. slab 114 and ridge waveguide 112) that might otherwise build up due to annealing. Consequently, optical material 110 may be less likely to undergo delamination or other stress-induced damage. Further, formation of free surface 130 may be accomplished with less etching of optical material 110 than for free surfaces 120. Fabrication of electro-optic device 110' may thus be facilitated. Thus, performance and reliability of electro-optic device(s) 100 and/or 100' may be improved.

Figure 2A:
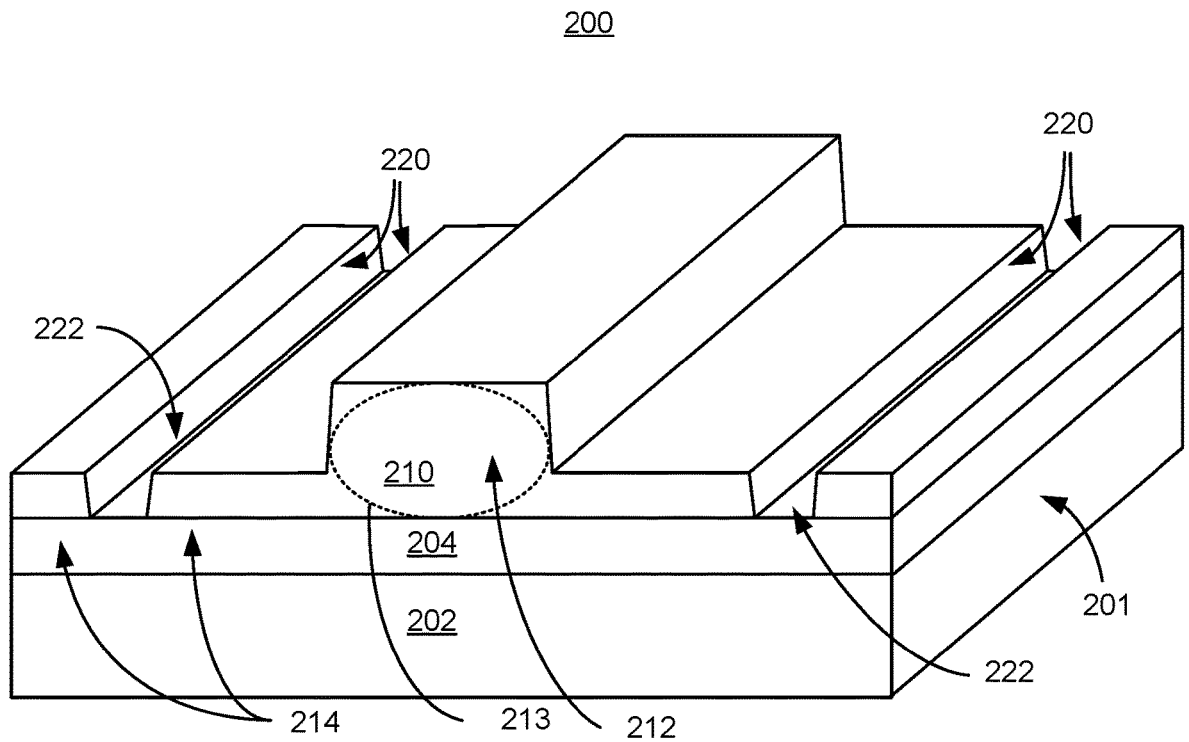
FIGS. 2A-2D depict embodiments of electro-optic devices utilizing thin film electro-optic materials including lithium.
Figure 2B:
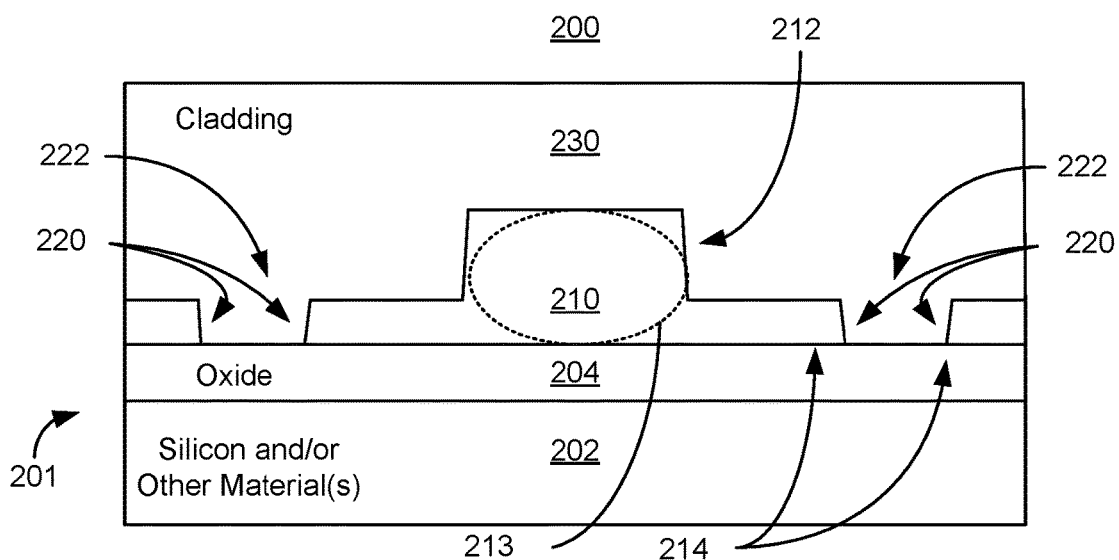

FIGS. 2A-2D depict embodiments of electro-optic devices 200 and 200'. FIGS. 2A and 2B depict perspective and cross-sectional views of an embodiment of electro-optic device 200 utilizing optical material 210 exhibiting the electro-optic effect. Electro-optic device 200 and optical material 210 are analogous to electro-optic device 100 and optical material 110, respectively. For example, the optical material 210 may include or consist of one or more of LN, LT, BTO, and/or plasmonics. Further, optical material 210 includes ridge waveguide 212 and slab 214 that are analogous to ridge waveguide 112 and slab 114. The optical material 210 is on substrate 201 including oxide layer 204, and underlying wafer 202 that are analogous to substrate 101, oxide layer 104, and underlying wafer 102. In some embodiments, oxide layer 204 may be omitted. Also shown is cladding 230, which is analogous to cladding 130.

Slab 214 has a top surface and includes free surfaces 220. For clarity, only some free surfaces 220 are labeled in FIGS. 2A-2B. In the embodiment shown in FIGS. 2A-2B, free surfaces 220 are formed by trenches 222 in optical material 210. In some embodiments, trenches 222 extend through slab 214. In some embodiments, one or more depressions in slab 214 (i.e. trenches that do not extend through slab 114) are used in lieu of some or all of trenches 222. Although indicating as terminating at oxide layer 204, in some embodiments, trenches 222 may extend into or through oxide 204 (e.g. to or into the underlying substrate 202). In some embodiments, trenches 222 may have another configuration. For example, trenches 222 may have other shape(s) (e.g. the width, length, and/or depth of the trench may vary along the trench), be separated by other distance(s), and/or be distributed across slab 214 in another manner (e.g. may not run parallel to ridge waveguide 212). In some embodiments, trenches 222 may extend further than (i.e. are wider than) shown. For example, trenches 222 may extend to the edge of the slab 214. Stated differently, optical material 210, and thus slab 214, may terminate at the edge of trenches 222 closes to ridge 212.

Free surfaces 220 are at a nonzero angle from the top surface of slab 214. In the embodiment shown, free surfaces 220 are substantially perpendicular (e.g. within ten degrees of perpendicular) to the top surface of slab 214 and/or the top surface of substrate 201. In other embodiments, free surfaces 220 may be at another nonzero angle with respect to the top surface of slab 214 and/or substrate 201. For example, free surfaces 220 may be at least fifty degrees and up to ninety degrees from horizontal surfaces (e.g. the top surface of substrate 201). In some embodiments, slab 214 and ridge waveguide 212 may thus be considered to form a double trapezoid (e.g. ridge waveguide 212 is a trapezoid on a portion of slab 214 that is also trapezoidal in cross section). Free surfaces 220 may mitigate stress (e.g. in-plane stress) in slab 214. For example, stress due to annealing and/or other processing may be reduced by free surfaces 220.

Optical structures 212 and 214 (i.e. ridge waveguide 212 and slab 214) are analogous to optical structures 112 and 114 and may be formed using analogous processes. As a result, optical structures 212 and 214 and electro-optic device 200 may have improved performance. Optical structures 212 and 214 may be formed using UV and/or DUV lithography and other processing that allows for improved surface roughness. In some embodiments, the short-range RMS surface roughness of sidewalls of waveguide 212 is in the ranges described for waveguide 112. Further, the short-range RMS roughness of the top surfaces of ridge waveguide 212 may be in the same range as described for ridge waveguide 112. In some embodiments, the long range (lengths greater than two hundred nanometers through two hundred micrometers) RMS surface roughness of the sidewalls of ridge waveguide 212 may differ from the short-range RMS surface roughness. The presence of trenches 222 may also improve optical confinement by ridge waveguide 212. In some cases, the sidewalls of ridge waveguide 212 may be desired to be shallow (further from perpendicular to the top surface of slab 214) to provide more efficient modulation. However, for sidewalls that are shallow, confinement of optical mode 213 may be reduced. Stated differently, optical mode 213 may extend laterally further than desired. The presence of trenches 222 and free surface 220 closest to ridge waveguide 212 enhances lateral confinement of optical mode 213. Thus, modulation may be made more efficient through the use of shallower sidewalls of ridge waveguide 212, while optical mode 213 confinement may be enhanced by the presence of trenches 222. Thus, performance of optical device 200 may be improved.

Further, optical material 210 may undergo higher temperature annealing. In some embodiments, optical material 210 is annealed at anneal temperatures described for optical material 110. High temperature annealing may improve the crystal structure of the optical material (e.g. the structure of LN and/or LT). For example, losses due to absorption in optical material 210 may be reduced.

Figure 2C:
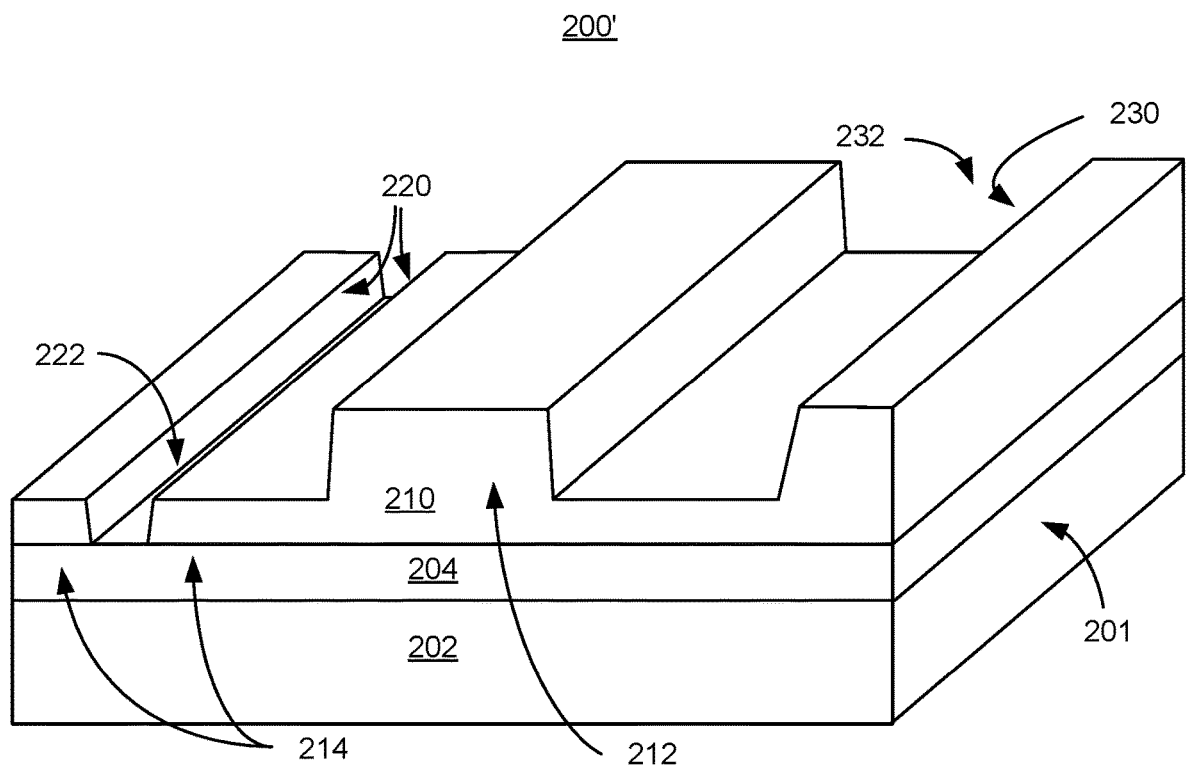
Figure 2D:
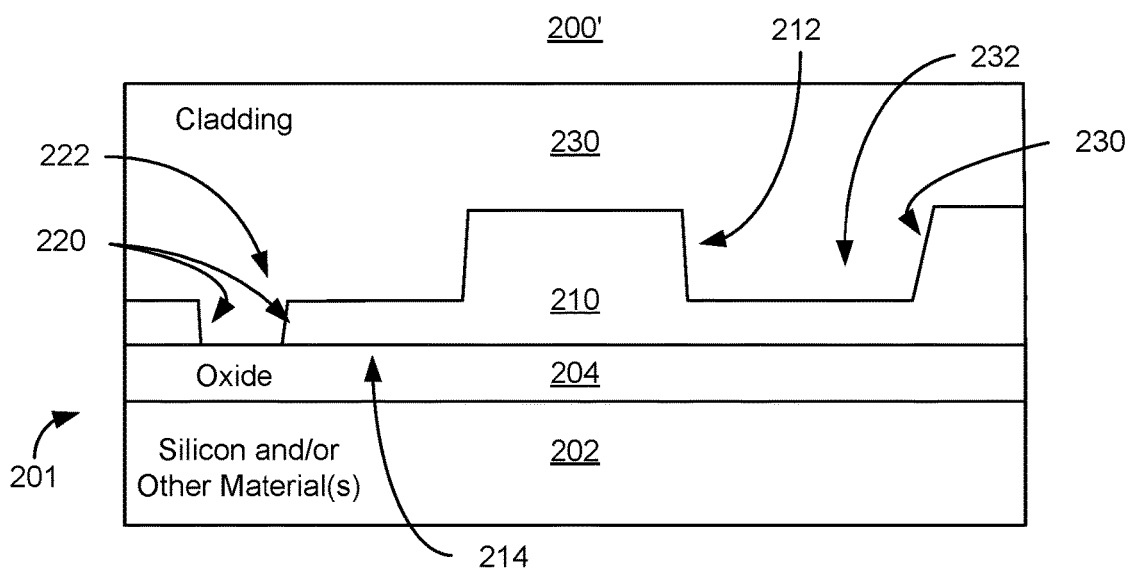

FIGS. 2C and 2D depict perspective and cross-sectional views of an embodiment of electro-optic device 200' that is analogous to electro-optic device 200. For example, the optical material 210 may include or consist of one or more of LN, LT, BTO, and/or plasmonics. Further, optical material 210 includes ridge waveguide 212 and slab 214 that are analogous to corresponding structures shown in FIGS. 2A-2B. The optical material 210 is on substrate 201 including oxide layer 204, and underlying wafer 202 that are analogous to that are analogous to corresponding structures shown in FIGS. 2A-2B. In some embodiments, oxide layer 204 may be omitted. Also shown is cladding 230, which is analogous to cladding shown in FIG. 2B. Also depicted are trench 222 and free surface 220 in slab 214. In some embodiments, some or all of trench 222 and free surface 220 may be omitted. Thus, slab 214 may not have free surfaces 220 therein.

Also shown in FIGS. 2C and 2D is depression 232 having free surface 230. In the embodiment shown, the portion of optical materials 210 below depression 232 has the same height as the remainder of slab 214. In some embodiments, the portion of optical materials 110 under depression 132 has a different height than the remainder of slab 114. Although one depression 232 is shown, multiple depressions may be present in ridge waveguide 212. Free surface 230 may have a similar function as free surfaces 220. In some embodiments, the ridge on which free surface 230 is present has a different height than ridge waveguide 212. In other embodiments, the ridge on which free surface 230 is present has the same height as ridge waveguide 212. In the embodiment shown, free surface 232 is on one side of ridge waveguide 212. In other embodiments, depressions 232 and free surfaces 230 may be on both sides of ridge waveguide 212.

Thus, electro-optic device(s) 200 and/or 200' may share the benefits of electro-optic device 100. Electro-optic material(s) such as LN and/or LT may be used, allowing for a larger modulation of the index of refraction for a given applied electric field. Because of the fabrication using UV or DUV lithography resulting in reduced surface roughness, optical losses (e.g. due to scattering) may be reduced. Further, annealing at optical material 210 at higher temperatures may further reduce optical losses (e.g. due to absorption). The presence of free surfaces 220 can mitigate stress in optical material 210 (e.g. slab 214) that might otherwise build up due to annealing. Consequently, optical material 210 may be less likely to undergo stress-induced damage. Trenches 220 may also enhance confinement of optical mode 213 and improve efficiency of devices 200 and/or 200' as optical modulators. Further, formation of free surface 230 may be accomplished with less etching of optical material 210 than for free surfaces 220. Fabrication of electro-optic device 210' may thus be facilitated. Thus, performance and reliability of electro-optic device(s) 200 and/or 200' may be improved.

Figure 3A:
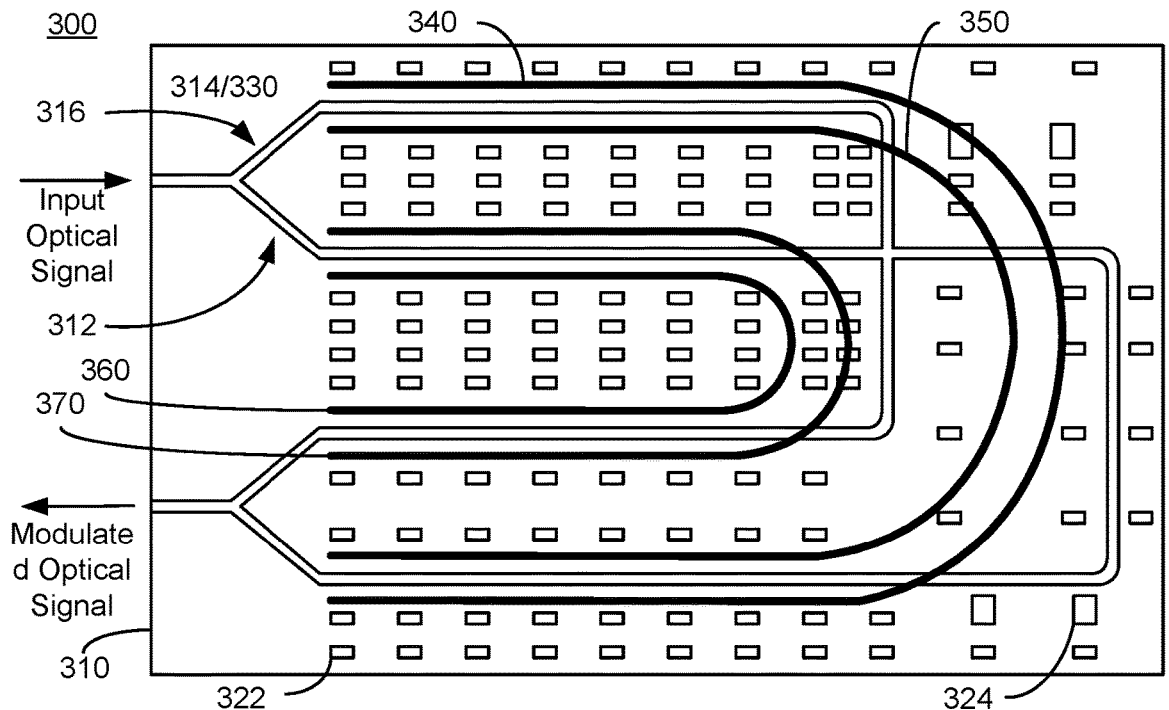
FIGS. 3A-3B depict embodiments of electro-optic devices utilizing thin film electro-optic materials including lithium.
Figure 3B:
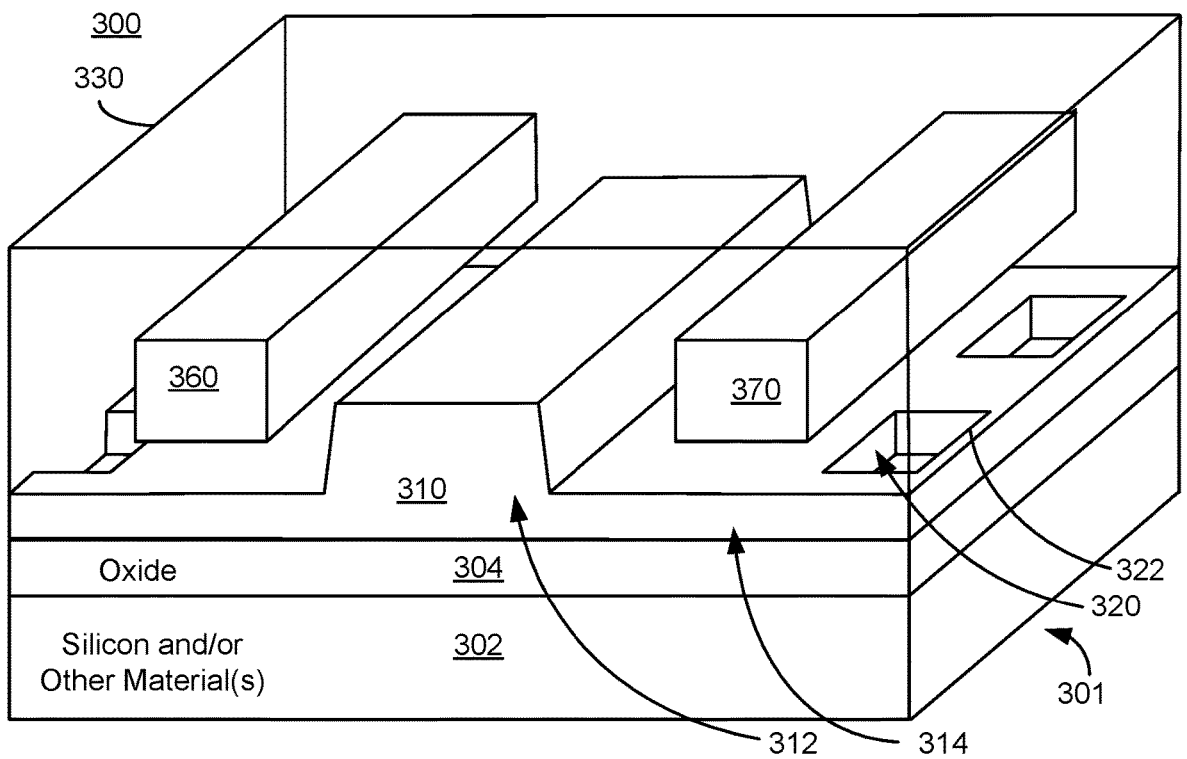

Use of optical structures having reduced surface roughness and higher anneal temperatures may improve performance of a variety of electro-optic devices. For example, FIGS. 3A and 3B depict top and perspective views of an embodiment of electro-optic device 300 utilizing optical material 310 exhibiting the electro-optic effect. Electro-optic device 300 is an optical modulator. Electro-optic device 300 and optical material 310 are analogous to electro-optic device 100 and optical material 110, respectively. For example, the optical material 310 may include one or more of LN, LT, BTO, and/or plasmonics. Optical material 310 includes slab 314 and ridge waveguides 312 and 316. Waveguides 312 and 316 are analogous to ridge waveguide 112. Slab 314 is analogous to slab 114. Also shown are electrodes 340, 350, 360, and 370. Although four electrodes 340, 350, 360, and 370 are shown, in some embodiments, another number and/or configuration of electrodes may be used. Cladding 330 and substrate 301 including oxide 304 and underlying wafer 302 are analogous to cladding 130, substrate 101, oxide 104, and wafer 102. In some embodiments, oxide 304 is sufficiently thick to reduce or prevent the intersection of a microwave mode due to an electrode signal carried by one or more of electrodes 340, 350, 360, and/or 370 with silicon wafer 302. In some embodiments, oxide layer 304 may be omitted. Although shown has having a particular size, distance from slab 314 and separation, in some embodiments, electrodes 340, 350, 360, and/or 370 may be configured differently. For example, electrodes 340, 350, 360, and 370 may be further from slab 314 and/or closer to waveguide 312 or 316. In other embodiments, electrodes 340, 350, 360, and/or 370 may be set into slab 314.

Slab 314 has a top surface and includes free surfaces 320 that are analogous to free surfaces 120. Thus, slab 314 has a distribution of apertures 322. For clarity, only some free surfaces 320 and apertures 322 are labeled in FIGS. 3A-3B. Some embodiments (e.g. the embodiment shown in FIGS. 3A-3B), apertures 322 extend through slab 314. In some embodiments, one or more depressions in slab 314 are used in lieu of some or all of apertures 322. Although indicating as terminating at oxide layer 304, in some embodiments, apertures 322 may extend into or through oxide 304 (e.g. to or into the underlying substrate 302). In the embodiment shown, the portion of slab 314 between electrodes 340 and 350 and waveguide 316 and the portion of slab 314 between electrodes 360 and 370 and waveguide 312 are free from apertures 322. In some embodiments, one or more apertures may exist in one or both of these regions. Thus, one or more free surfaces 320 may be between the electrodes 360 and 370 and waveguide 312. In some embodiments, no apertures 322 are between electrodes 340, 350, 360, and 370 and the underlying substrate 301 (e.g. none are aligned with and directly under electrodes 340, 350, 360, and/or 370). In some embodiments, apertures may exist in these regions. Thus, one or more free surfaces 320 may be between the electrodes 360 and 370 and underlying substrate 301. Although shown with a particular size, shape, and distribution, these and other characteristics of apertures 322 may be varied. In some embodiments, trenches analogous to trenches 222 may be used in lieu of or in addition to apertures 322. Although not shown in FIGS. 3A-3B, in some embodiments, depression(s) analogous to depression 132 and/or 232 may be present in addition to or in lieu of apertures 322.

Optical modulator 300 may have improved performance. As discussed with respect to optical device 100, optical properties of optical material 310 may be improved. For example, the sidewall roughnesses of waveguides 312 and 316 may be in the ranges described for waveguide 112. Further, optical material 310 may be annealed. Thus, optical losses may be reduced. Further, waveguides 312 and 316 cross in the embodiment shown. Because of the improved surface roughness and anneal, waveguides 312 and 316 may cross (as shown in FIG. 3A) while maintaining lower optical losses. Electrodes 340, 350, 360, and 370 may also be formed without crossings. Because materials such as LN and/or LT may be used for optical material 310, electrodes 340, 350, 360, and 370 may induce a larger change in the indices of refraction for waveguides 312 and 316. As indicated in FIG. 3A, both waveguides 312 and 316 and electrodes 340, 350, 360, and 370 have turns. As a result, the velocities of the optical signals in waveguides 312 and 316 may be matched with the velocities of the microwave signals in electrodes 340, 350, 360, and/or 370. Further, the optical losses for such turns may be reduced due to the improved surface roughnesses of waveguides 312 and 316. Thus, performance of optical modulator 300 may be improved.

Figure 4A:
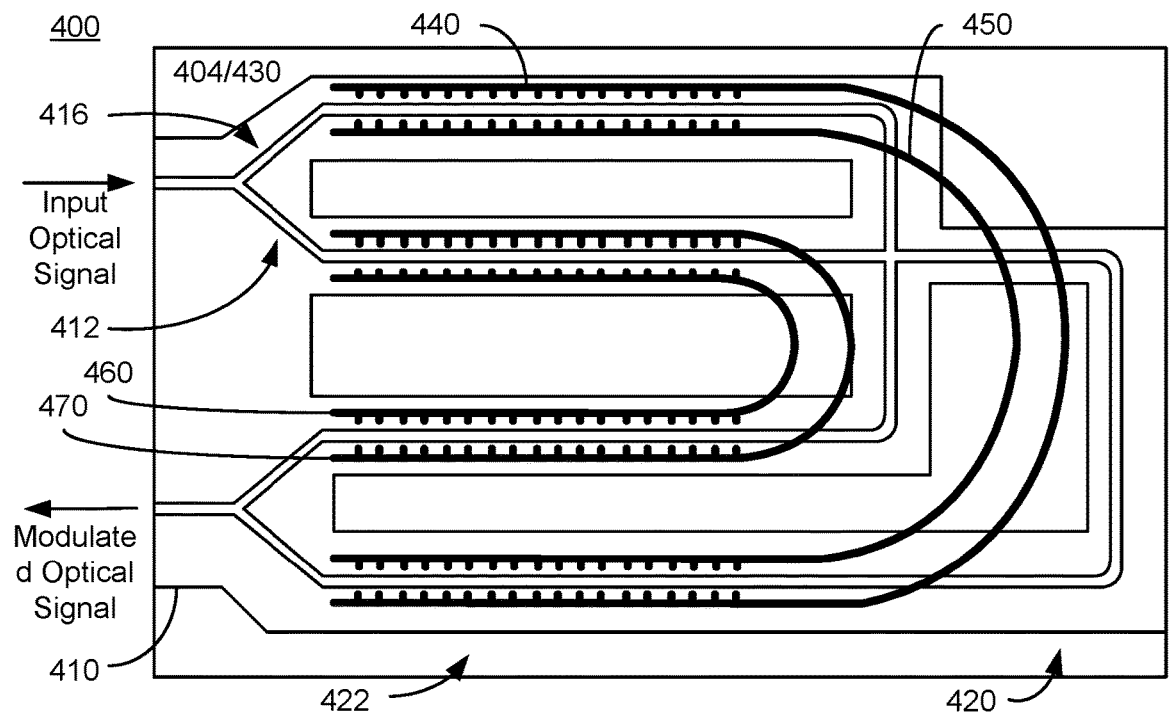
FIGS. 4A-4B depict an embodiment of electro-optic devices utilizing thin film electro-optic materials including lithium.
Figure 4B:
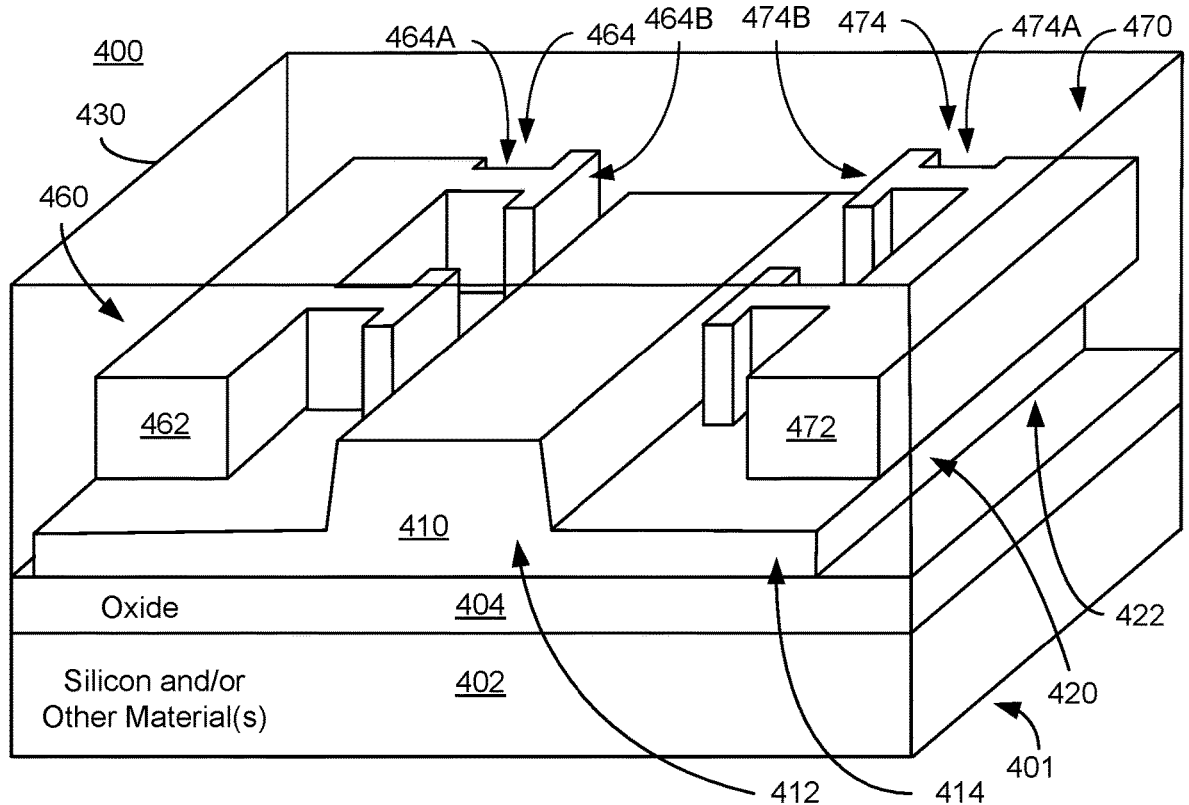

In another example, FIGS. 4A and 4B depict top and perspective views of an embodiment of electro-optic device 400 utilizing optical material 410 exhibiting the electro-optic effect. Electro-optic device 400 is an optical modulator. Electro-optic device 400 and optical material 410 are analogous to electro-optic device 200 and optical material 210, respectively. For example, the optical material 410 may include one or more of LN, LT, BTO, and/or plasmonics. Optical material 410 includes slab 414 and ridge waveguides 412 and 416. Waveguides 412 and 416 are analogous to ridge waveguide 212. Slab 414 is analogous to slab 214. Also shown are electrodes 440, 450, 460, and 470. Although four electrodes 440, 450, 460, and 470 are shown, in some embodiments, another number and/or configuration of electrodes may be used. Cladding 430 and substrate 401 including oxide 404 and underlying wafer 402 are analogous to cladding 230, substrate 201, oxide 204, and wafer 202. In some embodiments, oxide 204 is sufficiently thick to reduce or prevent the intersection of a microwave mode due to an electrode signal carried by one or more of electrodes 440, 450, 460, and/or 470 with silicon wafer 402. In some embodiments, oxide layer 404 may be omitted.

Slab 414 has a top surface and includes free surfaces 420 that are analogous to free surfaces 420. Thus, slab 414 has a distribution of trenches 422. For clarity, only some free surfaces 420 and trenches 422 are labeled in FIGS. 4A-4B. Some embodiments (e.g. the embodiment shown in FIGS. 4A-4B), trenches 422 extend through slab 414. In some embodiments, one or more depressions in slab 414 are used in lieu of some or all of trenches 422. Although indicating as terminating at oxide layer 404, in some embodiments, trenches 422 may extend into or through oxide 404 (e.g. to or into the underlying substrate 402). In the embodiment shown, the portion of slab 414 between electrodes 440 and 450 and waveguide 416 and the portion of slab 414 between electrodes 460 and 470 and waveguide 412 are free from trenches 422. In some embodiments, one or more trenches may exist in one or both of these regions. Thus, one or more free surfaces 420 may be between the electrodes 460 and 470 and waveguide 412. In some embodiments, no trenches 422 are between electrodes 440, 450, 460, and 470 and the underlying substrate 401 (e.g. none are aligned with and directly under electrodes 440, 450, 460, and/or 470). Thus, one or more free surfaces 420 may be between the electrodes 460 and 470 and underlying substrate 401. In some embodiments, trenches may exist in these regions. Although shown as extending through slab 414 to the edge of device 400, in some embodiments, trenches 422 may extend over a smaller region. For example, trenches 422 may only be in the region of electrodes 462 and 472. Although shown with a particular size, shape, and distribution, these and other characteristics of trenches 422 may be varied. In some embodiments, trenches 422 may extend further than (i.e. are wider than) shown. For example, trenches 422 may extend to the edge of the slab 414. Stated differently, optical material 410 may terminate at the edge of trenches 422 closes to ridge 412. In some embodiments, apertures analogous to apertures 122 may be used in lieu of or in addition to trenches 422. Although not shown in FIGS. 4A-4B, in some embodiments, depression(s) analogous to depression 132 and/or 232 may be present in addition to or in lieu of trenches 422.

Electrodes 440, 450, 460, and 470 include channel regions and extensions. For clarity, channel regions 462 and 472 and extensions 464 and 474 are labeled only in FIG. 4B. In the embodiment shown, extensions 464 and 474 include a connecting portion 464A and 474A, respectively, and a retrograde portion 464B and 474B, respectively. In some embodiments, extensions 464 and 474 may have a different shape. For example, extensions 464 and/or 474 may have an "L"-shape, may omit the retrograde portion, may be rectangular, trapezoidal, parallelogram-shaped, may partially or fully wrap around a portion of waveguide 412, and/or have another shape. Similarly, channel regions 462 and/or 472, which are shown as having a rectangular cross-section, may have another shape. Further, extensions 464 and/or 474 may have different sizes. Although all extensions 464 and 474 are shown as the same distance from ridge 412, some of extensions 464 and/or some of extensions 474 may be different distances from ridge 412. In some embodiments, extensions 464 and 474 are desired to have a length that corresponds to a frequency less than the Bragg frequency of the signal for electrodes 460 and 470. Thus, the length of extensions 464 and/or 474 may be desired to be not more than the microwave wavelength of the electrode signal divided by $\pi$ at the highest frequency of operation for electrodes 460 and 470. In some embodiments, the length of extensions 464 and/or 474 is desired to be less than the microwave wavelength divided by twelve. For example, if the maximum operation frequency is 300 GHz, which corresponds to a microwave wavelength of 440 micrometers in the substrate, extensions 464 and 474 are desired to be smaller than approximately 37 micrometers. Individual extensions 464 and/or 474 may be irregularly spaced or may be periodic. Periodic extensions have a constant pitch. In some embodiments, the pitch is desired to be a distance corresponding to a frequency that is less than the Bragg frequency. Thus, the pitch for extensions 464 and 474 may be desired to be not more than the microwave wavelength of the electrode signal divided by $\pi$ at the highest frequency of operation for electrodes 460 and 470. In some embodiments, the pitch is desired to be less than the microwave wavelength divided by twelve. In some embodiments, the pitch is desired to be less than the microwave wavelength divided by seventy-two, allowing for a low ripple in group velocity. Although shown as having a particular size, distance from slab 414 and separation, in some embodiments, electrodes 440, 450, 460, and/or 470 may be configured differently. For example, electrodes 440, 450, 460, and 470 may be further from slab 414 such that portions of the extensions are over waveguide 412 or 416. In other words, the separation between the extension may be less than the width of ridge waveguide 410. In other embodiments, electrodes 440, 450, 460, and/or 470 may be set into slab 414.

Optical modulator 400 may have improved performance. As discussed with respect to optical device 200, optical properties of optical material 410 may be improved. For example, the sidewall roughnesses of waveguides 412 and 416 may be in the ranges described for waveguide 212. Further, optical material 410 may be annealed. Thus, optical losses may be reduced. In addition, confinement of the optical mode (not shown in FIGS. 4A-4B) may be improved by trenches 422. In some embodiments, sidewalls of ridge waveguide 412 may be shallower to enhance modulation while maintaining optical mode confinement using trenches 222. Thus, flexibility of optical device 400 may be improved. Further, waveguides 412 and 416 cross in the embodiment shown. Because of the improved surface roughness and anneal, waveguides 412 and 416 may cross (as shown in FIG. 4A) while maintaining lower optical losses. Electrodes 440, 450, 460, and 470 may also be formed without crossings. Because materials such as LN and/or LT may be used for optical material 410, electrodes 440, 450, 460, and 470 may induce a larger change in the indices of refraction for waveguides 412 and 416. As indicated in FIG. 4A, both waveguides 412 and 416 and electrodes 440, 450, 460, and 470 have turns. As a result, the velocities of the optical signals in waveguides 412 and 416 may be matched with the velocities of the microwave signals in electrodes 440, 450, 460, and/or 470. Further, the optical losses for such turns may be reduced due to the improved surface roughnesses of waveguides 412 and 416. Moreover, use of electrodes 440, 450, 460, and/or 470 having extensions may further improve modulation, reduce microwave losses, and allow for enhanced velocity matching. Extensions, such as extensions 464 and 474, allow for the electric field to be enhanced at the waveguide 412 (because extensions are closer to waveguide 412), while allowing the microwave signal to be carried by channels 462 and 472. Thus, a higher optical modulation may be obtained while reducing the microwave losses. Moreover, extensions in combination with engineering of substrate 401 may improve velocity matching between the optical and microwave signals. Thus, performance of optical modulator 400 may be improved.

Figure 5:
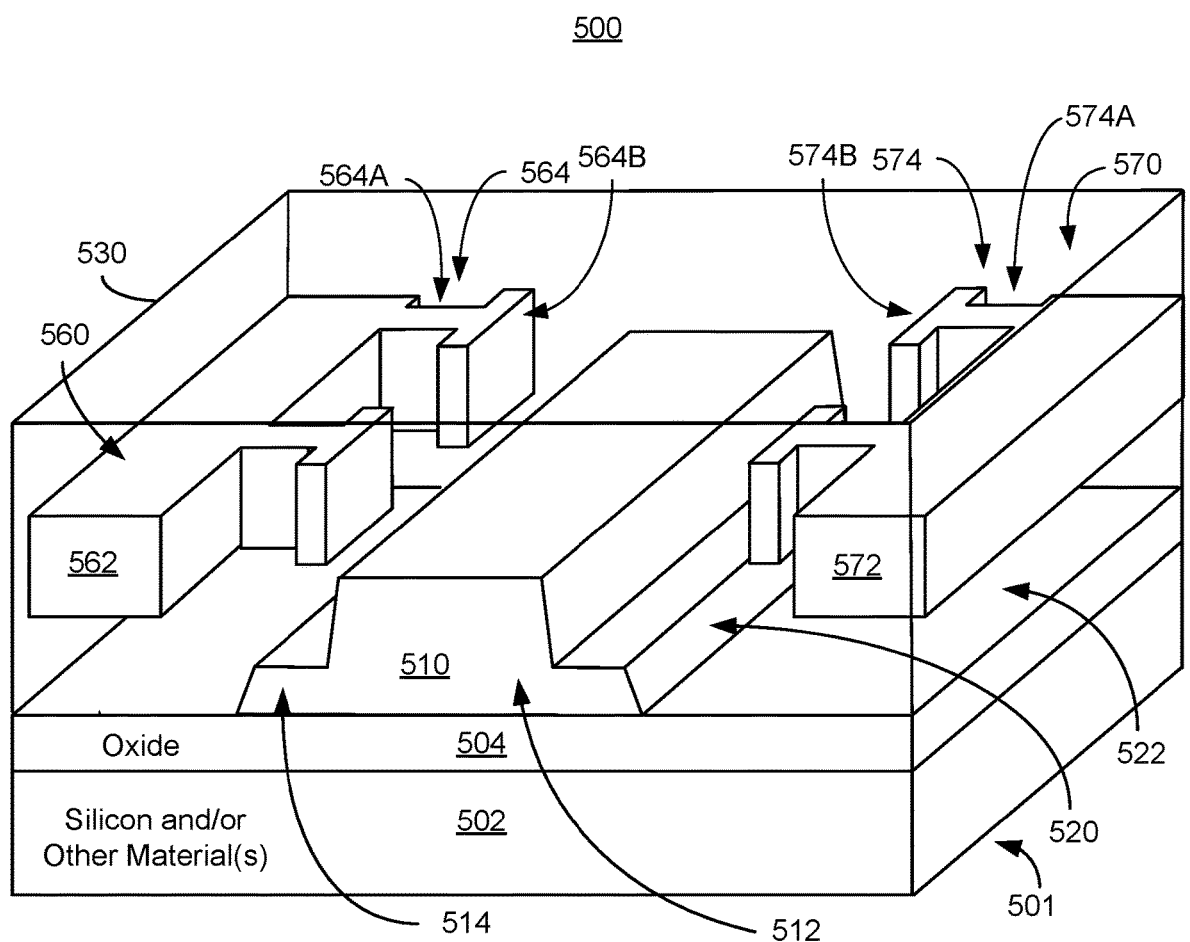
FIG. 5 depicts an embodiment of electro-optic devices utilizing thin film electro-optic materials including lithium.

In another example, FIG. 5 depicts a perspective view of a portion of an embodiment of electro-optic device 500 utilizing optical material 510 exhibiting the electro-optic effect and including lithium. Electro-optic device 500 is an optical modulator. Electro-optic device 500 and optical material 510 are analogous to electro-optic device 400 and optical material 410, respectively. For example, the optical material 510 may include one or more of LN, LT, BTO, and/or plasmonics. Optical material 510 includes slab 514 and ridge waveguide 512. Waveguide 512 is analogous to ridge waveguide 412. Slab 514 is analogous to slab 414. Thu, trenches 522 and free surfaces 520 are analogous to trenches 420 and free surfaces 422. Also shown are electrodes 560 and 570 that are analogous to electrodes 460 and 470. Thus, extensions 564 and 574 having connecting portions 564A and 574A and retrograde portions 564B and 574B are analogous to extensions 464 and 474. For simplicity, only one waveguide 412 and two electrodes 460 and 470 are shown. However, typically multiple waveguides and more pairs of electrodes (e.g. as in FIGS. 4A and 4B) are utilized. Although two electrodes 560 and 570 are shown, in some embodiments, another number and/or configuration of electrodes may be used. Cladding 530 and substrate 501 including oxide 504 and underlying wafer 502 are analogous to cladding 430, substrate 401, oxide 404, and wafer 402. In some embodiments, oxide 504 is sufficiently thick to reduce or prevent the intersection of a microwave mode due to an electrode signal carried by one or more of electrodes 560 and/or 570 with silicon wafer 502. In some embodiments, oxide layer 504 may be omitted.

In the embodiment shown, trenches 522 extend to the region between ridge waveguide 512 and extensions 564 and 574. In some embodiments, trenches 522 extend to retrograde portions 564B and 574B. In such embodiments, slab 514 extends from ridge waveguide 512 to retrograde portions 564B and 574B. In some embodiments, trenches 522 extend to the region between retrograde portions 564 and 574 and channels 562 and 572. Thus, slab 514 extends from ridge waveguide 512 to retrograde portions 564B and 574B. In some embodiments, trenches 522 extend to the channels 562 and 572. Thus, slab 514 extends from ridge waveguide 512 to channels 560 and 570. Thus, in some embodiments, slab 514 need not and does not extend past electrodes 560 and 570. Electro-optic device 500 shares some or all of the benefits of electro-optical device 400, though is configured somewhat differently.

Electro-optic devices 100, 100', 200, 200', 300, 400, and 500 have been described. Various feature(s) of devices 100 100', 200, 200', 300, 400, and/or 500 may be combined in manners not explicitly described herein.

Figure 6:
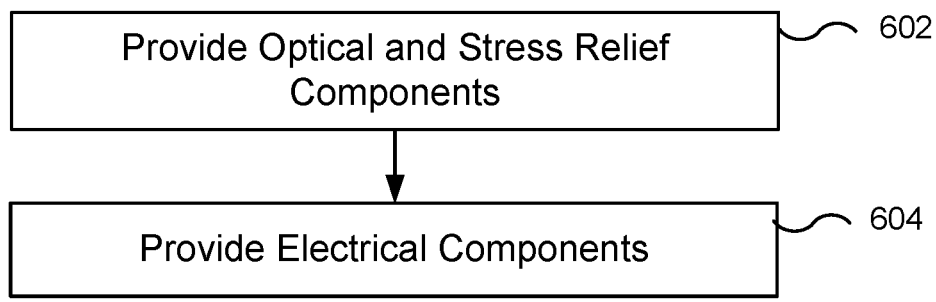
FIG. 6 is a flow chart depicting an embodiment of a method for providing an electro-optic devices utilizing thin film electro-optic materials including lithium.

FIG. 6 depicts an embodiment of method 600 for providing an electro-optic device, such as one or more devices 100, 200, 300, and/or 400. Method 600 is described in the context of processes that may have sub-processes. Although described in a particular order, another order not inconsistent with the description herein may be utilized. Although fabrication of a single device is described, multiple devices are typically fabricated together. Method 600 starts after an electro-optic material, such as an LN and/or LT layer has been provided on a substrate. In some embodiments, the LN and/or LT layer may be thin, for example, not more than ten micrometers in thickness. In some embodiments, the LN and/or LT layer may be not more than three micrometers thick. In some embodiments, the LN layer may be not more than one micrometer in thickness. In some embodiments, the thickness of the LN layer may be not more than seven hundred nanometers. In some such embodiments, the thickness may be not more than four hundred nanometers. In some embodiments, the thickness may be at least one hundred micrometers. Other thicknesses are possible. Underlayers, such as silicon dioxide, may exist between the LN layer and a carrier wafer. In some embodiments, the carrier wafer may include silicon, quartz, silica, LN, sapphire and/or another material. For example, the LN layer may reside on a silicon dioxide underlayer having a thickness of nominally at least two and not more than five micrometers. Other thicknesses, additional layers and/or other layers may be present. Method 600 may also be used in connection with one or more of the techniques described in the above-identified co-pending applications.

Optical and stress relief components are provided for the electro-optic device at 602. In some embodiments, these components are formed from the electro-optic material. For example, 602 may include utilizing the methods described in the above-identified patent applications to form ridge and/or channel waveguide(s) as well as stress relief components such as free surfaces. Other optical components, such as mode converter(s) and polarization beam rotator(s), may also be formed.

Electrical components are formed, at 604. In some embodiments, 604 may include forming electrodes for an optical modulator. Other electrical components, such as CMOS or other components, may also be formed at 604.

Using method 600, electro-optic devices such as devices 100, 200, 300 and/or 400 may be formed. Thus, the benefits described herein, including but not limited to stress management, may be achieved.

Figure 7:
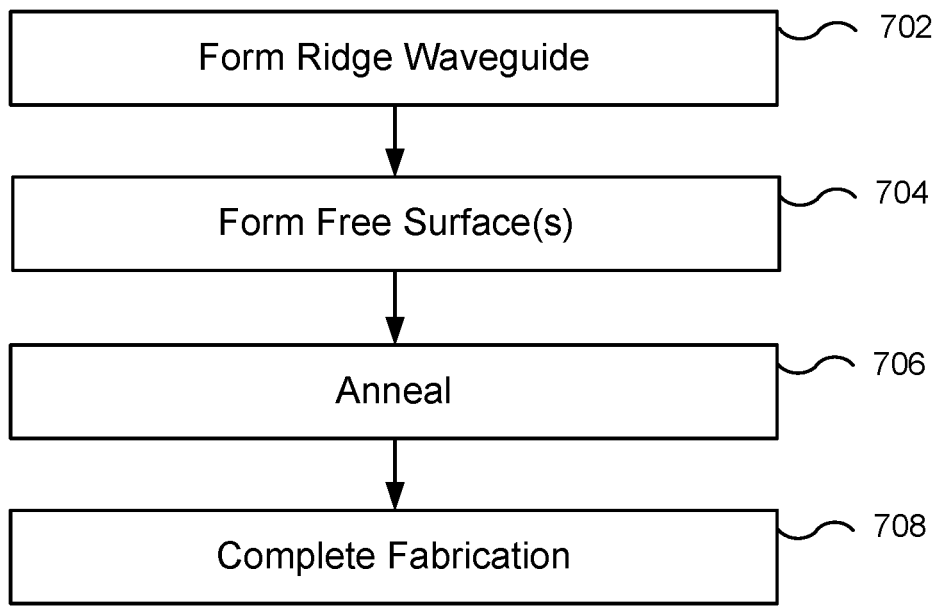
FIG. 7 is a flow chart depicting an embodiment of a method for providing an electro-optic devices utilizing thin film electro-optic materials including lithium.

FIG. 7 depicts an embodiment of method 700 for providing an electro-optic device, such as one or more devices 100, 200, 300, and/or 400. Method 700 is described in the context of processes that may have sub-processes. Although described in a particular order, another order not inconsistent with the description herein may be utilized. Although fabrication of a single device is described, multiple devices are typically fabricated together. Method 700 starts after an electro-optic material, such as an LN and/or LT layer has been provided on a substrate. In some embodiments, the LN and/or LT layer may be thin, for example, not more than ten micrometers in thickness. In some embodiments, the LN layer may be not more than one micrometer in thickness. In some embodiments, the thickness of the LN layer may be not more than seven hundred nanometers. In some such embodiments, the thickness may be not more than four hundred nanometers. Other thicknesses are possible. Underlayers, such as silicon dioxide, may exist between the LN layer and a carrier wafer. In some embodiments, the carrier wafer may include silicon, quartz, silica, LN, sapphire and/or another material. For example, the LN layer may reside on a silicon dioxide underlayer having a thickness of nominally at least two and not more than five micrometers. Other thicknesses, additional layers and/or other layers may be present. Method 700 may also be used in connection with one or more of the techniques described in the above-identified co-pending applications.

A ridge waveguide is provided from optical material(s) having an electro-optic effect, at 702. In some embodiments, one or more depressions analogous to depressions 130 and/or 230 may be formed as part of 702. Thus, 702 may include utilizing lithography and etch(es) to pattern one or more electro-optic materials. Such processing may be performed using techniques analogous to those described in the above-identified co-pending applications. Consequently, the electro-optic material has been formed into at least the ridge waveguide and slab. In some embodiments, multiple ridge waveguides and/or additional structures such as mode converters are also formed at 702.

Free surfaces are formed in the slab, at 704. In some embodiments, 704 includes forming depressions, trenches and/or apertures in the slab. The free surfaces may be formed using lithography and etch(es) of the electro-optic materials. Such processing may be performed using techniques analogous to those described in the above-identified co-pending applications. In some embodiments, 702 and 704 may be performed together. In some embodiments, 704 is performed prior to 702. In other embodiments, 704 is performed after 702. As indicated above, the free surfaces are at nonzero angle(s) from the top surface of the slab and mitigate stress in the slab.

The device being fabricated is annealed at anneal temperature(s) greater than 300 degrees Celsius, at 706. In some embodiments, optical material 110 is annealed at anneal temperatures greater than 400 degrees Celsius. Optical material 110 may be annealed at anneal temperatures greater than 500 degrees Celsius. In some embodiments, the anneal temperature(s) are greater than 600 degrees Celsius. In some embodiments, the anneal temperature(s) are greater than 700 degrees Celsius. In some embodiments, the anneal temperature(s) are greater than 800 degrees Celsius. In some embodiments, the anneal temperature(s) are greater than 900 degrees Celsius. In some embodiments, the anneal temperature(s) are greater than 1000 degrees Celsius. In some embodiments, 706 includes performing multiple anneals, at least one of which is at the anneal temperature(s) described herein. The anneal performed at 706 may be performed after 704 has been completed. In some embodiments, the anneal is performed after 702 and 704 are performed.

Fabrication of the electro-optic device is completed, at 708. For example, other optical structures may be formed and electrical components fabricated. The individual electro-optic device may also be separated from the wafer (or array of devices being fabricated) at 708.

Using method 700, electro-optic devices such as devices 100, 200, 300 and/or 400 may be formed. Thus, the benefits described herein, including but not limited to stress management, may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electro-optic device, comprising:
   at least one optical material having an electro-optic effect and including lithium, the at least one optical material having a slab and a ridge waveguide, the slab having a top surface and a bottom surface, the ridge waveguide having a first height and sidewalls adjoining the slab, the slab having a second height less than the first height;
   an electrode, a portion of the slab being between the ridge waveguide and the electrode; and
   cladding having a cladding dielectric constant lower than a dielectric constant of the at least one optical material;
   wherein the slab includes a plurality of free surfaces;
   wherein a free surface of the plurality of free surfaces is closer to the ridge waveguide than the electrode is, the free surface extending from the top surface to at least the bottom surface and forming an edge of the slab;
   wherein the plurality of free surfaces share interfaces with the cladding and wherein the slab and ridge waveguide are treated by an anneal performed after formation of the plurality of free surfaces, the anneal having an annealing temperature greater than three hundred degrees Celsius and reducing optical propagation losses; and
   wherein each of the plurality of free surfaces is at a nonzero angle from the top surface of the slab and mitigates stress caused in the slab by the anneal.

2. The electro-optic device of claim 1, wherein the at least one optical material includes at least one of lithium niobate or lithium tantalate.

3. The electro-optic device of claim 1,
   wherein a free surface of the plurality of free surfaces is further from the ridge waveguide than the electrode is.

4. The electro-optic device of claim 1, wherein the electrode is on the top surface of the slab.

5. The electro-optic device of claim 1,
   wherein at least a portion of the electrode resides on the cladding.

6. The electro-optic device of claim 1,
   wherein the plurality of free surfaces includes an additional free surface, the ridge waveguide being between the free surface and the additional free surface, the additional free surface being a second edge of the slab.

7. The electro-optic device of claim 6, wherein the edge and the second edge are substantially parallel to at least a portion of the ridge waveguide.

8. The electro-optic device of claim 1, wherein the slab has an edge and wherein at least one of the plurality of free surfaces is between the edge of the slab and the ridge waveguide.

9. The electro-optic device of claim 1, wherein the slab resides on a substrate and wherein an additional free surface of the plurality of free surfaces extends from the top surface of the slab to the substrate.

10. The electro-optic device of claim 1, wherein the slab resides on a substrate, the slab has a thickness, and an additional free surface of the plurality of free surfaces extends through the slab a distance less than the thickness.

11. The electro-optic device of claim 1, wherein the plurality of free surfaces defines at least one aperture in the slab.

12. The electro-optic device of claim 1, wherein the at least one optical material includes an additional ridge waveguide.

13. The electro-optic device of claim 1, wherein the slab includes a trench therein, the trench having a sidewall and being parallel to at least a portion of the ridge waveguide, an additional free surface of the plurality of free surfaces being the sidewall.

14. The electro-optic device of claim 1, wherein the at least one optical material resides on a substrate including a dielectric layer and an underlying substrate, the dielectric layer having a thickness of at least three micrometers, the free surface having a bottom edge contacting the dielectric layer such that the dielectric layer is free of apertures proximate to the free surface, and wherein the dielectric layer includes a silicon oxide layer and the underlying substrate includes a silicon substrate.

15. An electro-optic device, comprising:
   at least one optical material having an electro-optic effect and including lithium, the at least one optical material having a slab and a ridge waveguide, the slab having a top surface, a first edge, and a second edge, the first edge and the second edge being substantially parallel to a portion of the ridge waveguide, the ridge waveguide having a first height and sidewalls adjoining the slab, the slab having a second height less than the first height, the slab terminating at the first edge and at the second edge;
   a plurality of electrodes, the ridge waveguide being between a first electrode and a second electrode of the plurality of electrodes;

cladding having a cladding dielectric constant lower than a dielectric constant of the at least one optical material; and a substrate having a plurality of substrate edges, the first edge of the slab being between the ridge waveguide and a first substrate edge of the plurality of substrate edges, the second edge of the slab being between the ridge waveguide and a second substrate edge of the plurality of substrate edges, the first edge of the slab being between the ridge waveguide and the first electrode;

wherein the first edge and the second edge form a plurality of free surfaces at a nonzero angle from the top surface of the slab;

wherein the plurality of free surfaces share interfaces with the cladding and wherein the slab and ridge waveguide are treated by an anneal performed after formation of the plurality of free surfaces, the anneal having an annealing temperature greater than three hundred degrees Celsius and reducing optical propagation losses;

wherein each of the plurality of free surfaces is at a nonzero angle from the top surface of the slab and mitigates stress caused in the slab by the anneal.

16. The electro-optic device of claim 15, wherein the second edge of the slab is between the second electrode and the ridge waveguide.

17. A method for providing an electro-optic device, comprising:

providing a ridge waveguide from at least one optical material having an electro-optic effect and including lithium, the at least one optical material having a slab and the ridge waveguide, the slab having a top surface and a bottom surface, the ridge waveguide having a first height and sidewalls adjoining the slab, the slab having a second height less than the first height;

providing an electrode, a portion of the slab being between the ridge waveguide and the electrode; and providing, for the slab, a plurality of free surfaces;

providing cladding having a cladding dielectric constant lower than a dielectric constant of the at least one optical material, the plurality of free surfaces sharing interfaces with the cladding;

annealing at at least one anneal temperature greater than 300 degrees Celsius after formation of the plurality of free surfaces, the annealing reducing optical propagation losses;

wherein a free surface of the plurality of free surfaces is closer to the ridge waveguide than the electrode is, the free surface extending from the top surface to at least the bottom surface and forming an edge of the slab;

wherein each of the plurality of free surfaces is at a nonzero angle from the top surface of the slab and mitigates stress caused in the slab by the anneal.

18. The method of claim 17, wherein the at least one optical material includes at least one of lithium niobate or lithium tantalate.

19. The method of claim 17, wherein the at least one anneal temperature is greater than one thousand degrees Celsius.

* * * * *